(12) United States Patent
Chakraborty et al.

(10) Patent No.: US 12,340,521 B2
(45) Date of Patent: *Jun. 24, 2025

(54) TRAINING MULTI-OBJECT TRACKING MODELS USING SIMULATION

(71) Applicant: Microsoft Technology Licensing, LLC, Redmond, WA (US)

(72) Inventors: Ishani Chakraborty, Seattle, WA (US); Jonathan C. Hanzelka, Kenmore, WA (US); Lu Yuan, Redmond, WA (US); Pedro Urbina Escos, Seattle, WA (US); Thomas M. Soemo, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/508,224

(22) Filed: Nov. 13, 2023

(65) Prior Publication Data

US 2024/0078682 A1 Mar. 7, 2024

Related U.S. Application Data

(63) Continuation of application No. 17/585,053, filed on Jan. 26, 2022, now Pat. No. 11,854,211, which is a
(Continued)

(51) Int. Cl.
*G06T 7/20* (2017.01)
*G06N 20/00* (2019.01)
(Continued)

(52) U.S. Cl.
CPC ............ *G06T 7/20* (2013.01); *G06N 20/00* (2019.01); *G06T 17/00* (2013.01); *G06T 19/20* (2013.01);
(Continued)

(58) Field of Classification Search
CPC .......... G06T 7/20; G06T 17/00; G06T 19/20; G06T 2207/10016; G06T 2207/20081;
(Continued)

(56) References Cited

U.S. PATENT DOCUMENTS 11,386,662 B2   7/2022  Chakraborty
11,854,211 B2*  12/2023 Chakraborty .......... G06N 20/00

OTHER PUBLICATIONS

Notice of Allowance mailed on Dec. 15, 2021, in U.S. Appl. No. 16/886,442, 8 Pages.
(Continued)

*Primary Examiner* — Maurice L. McDowell, Jr.
(74) *Attorney, Agent, or Firm* — Foley IP Law, PLLC

(57) ABSTRACT

Training a multi-object tracking model includes: generating a plurality of training images based at least on scene generation information, each training image comprising a plurality of objects to be tracked; generating, for each training image, original simulated data based at least on the scene generation information, the original simulated data comprising tag data for a first object; locating, within the original simulated data, tag data for the first object, based on at least an anomaly alert (e.g., occlusion alert, proximity alert, motion alert) associated with the first object in the first training image; based at least on locating the tag data for the first object, modifying at least a portion of the tag data for the first object from the original simulated data, thereby generating preprocessed training data from the original simulated data; and training a multi-object tracking model with the preprocessed training data to produce a trained multi-object tracker.

20 Claims, 9 Drawing Sheets

Related U.S. Application Data continuation of application No. 17/026,084, filed on Sep. 18, 2020, now Pat. No. 11,335,008.

(51) Int. Cl.
*G06T 17/00* (2006.01)
*G06T 19/20* (2011.01)

(52) U.S. Cl.
CPC ............. *G06T 2207/10016* (2013.01); *G06T 2207/20081* (2013.01); *G06T 2207/30196* (2013.01); *G06T 2207/30241* (2013.01); *G06T 2219/2004* (2013.01)

(58) Field of Classification Search
CPC . G06T 2207/30196; G06T 2207/30241; G06T 2219/2004; G06T 2207/20084; G06N 20/00
See application file for complete search history.

(56) References Cited

OTHER PUBLICATIONS

Notice of Allowance mailed on Oct. 3, 2023, in U.S. Appl. No. 17/827,695, 9 Pages.
Communication pursuant to Article 94(3) Received in European Patent Application No. 21724142.1, mailed on Feb. 13, 2025, 08 pages.

\* cited by examiner

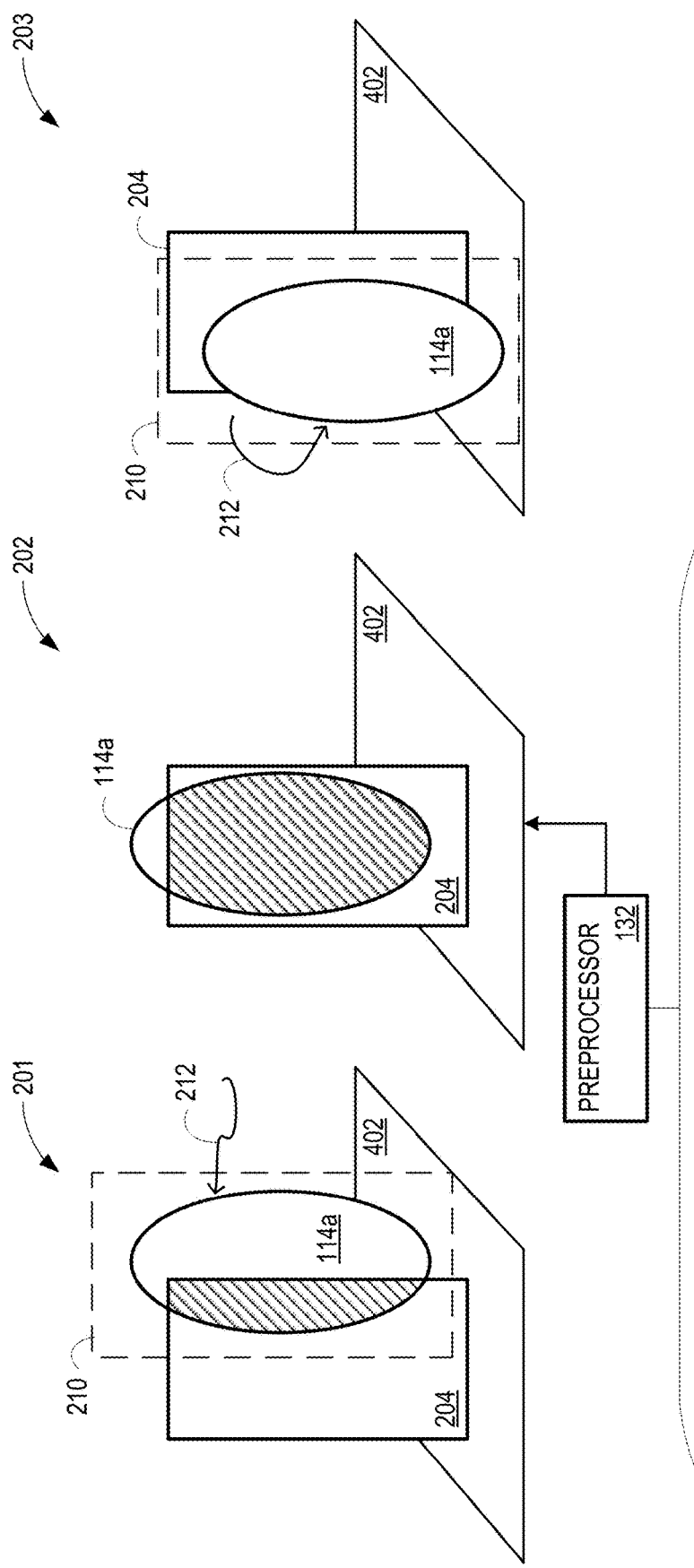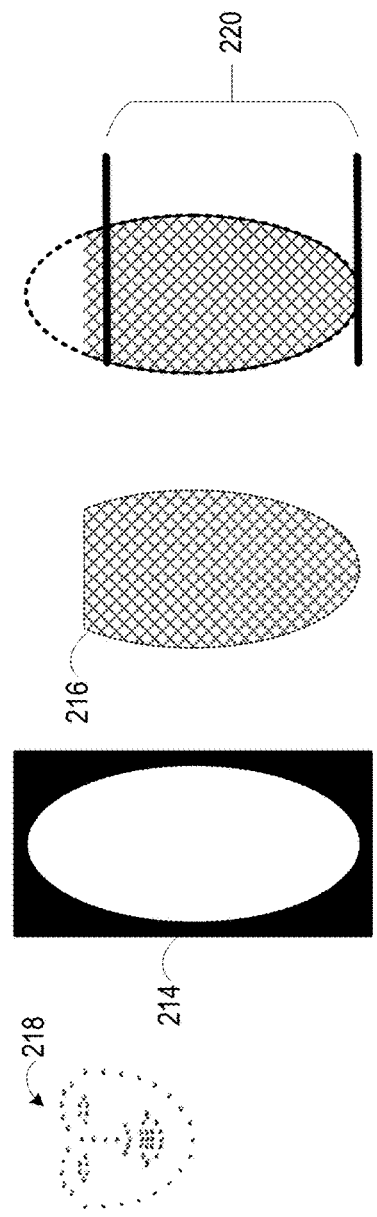
FIG. 2

FIG. 4
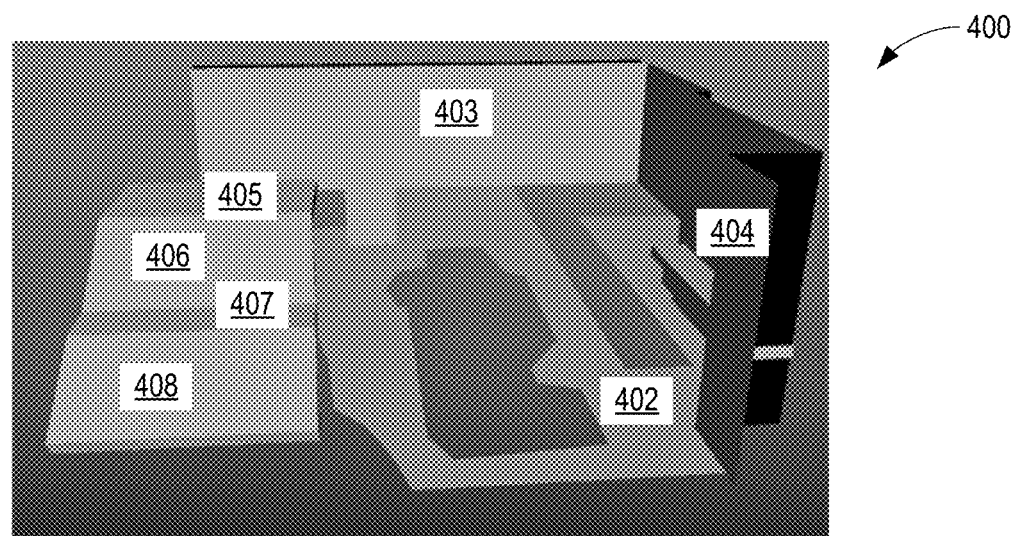
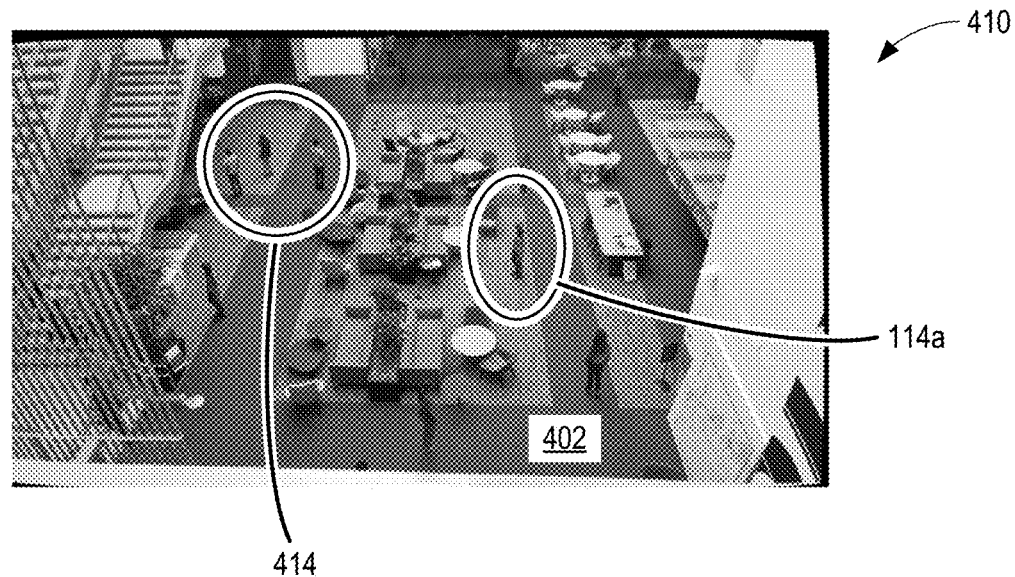

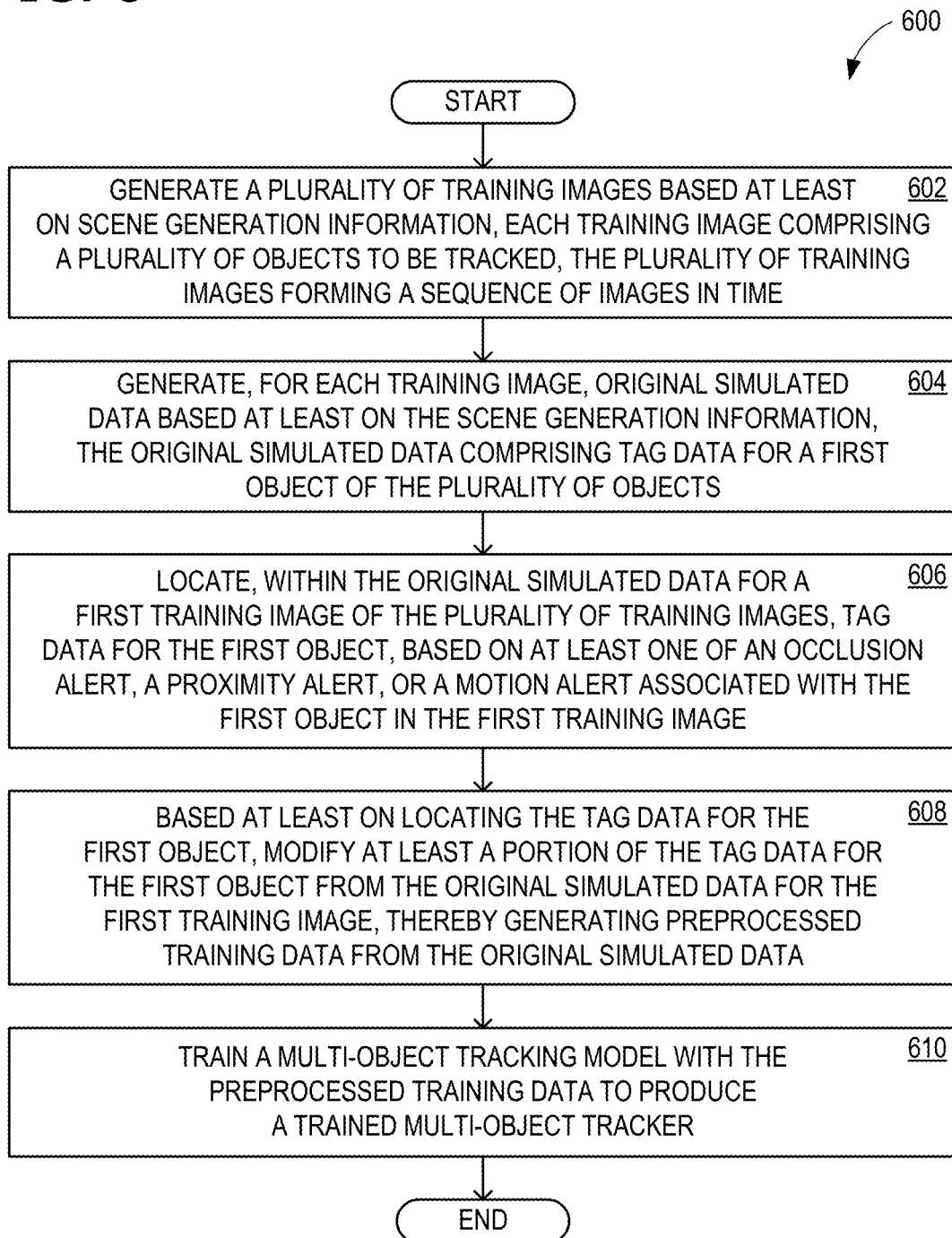

TRAINING MULTI-OBJECT TRACKING MODELS USING SIMULATION

CROSS-REFERENCE TO RELATED APPLICATION

This application is a continuation application of and claims priority to U.S. patent application Ser. No. 17/585,053, entitled "TRAINING MULTI-OBJECT TRACKING MODELS USING SIMULATION," filed on Jan. 26, 2022, which is a continuation application of and claims priority to U.S. patent application Ser. No. 17/026,084 (now U.S. Pat. No. 11,335,008, entitled "TRAINING MULTI-OBJECT TRACKING MODELS USING SIMULATION," filed on Sep. 18, 2020, the disclosures of which are incorporated herein by reference in their entireties.

BACKGROUND

Deep learning models used for multi-object tracking (MOT) have significant potential for reconnaissance, sports analysis (identifying specific players), worksite efficiency analysis, worksite safety (human-robot shared space), and behavior analysis of retail guests. However, realizing such potential requires access to a large amount of high-quality, properly-labeled training data. Unfortunately, properly-labeled datasets may not be readily available, and may be challenging to obtain or produce. For example, for a five-minute video, captured at 30 frames per second, there are 9,000 frames to be labeled. With four objects to be tracked (e.g., people) per frame, there are 36,000 bounding boxes to be drawn and associated with a unique identification (ID) in order to be tracked frame-to-frame (e.g., to train for tracking, rather than merely for detection or identification). Such a labeling task may be overly expensive and time-consuming, even leveraging efficiency techniques such as frame-skipping and interpolation—and yet may still not provide a sufficient amount of training data. Additionally, there may be privacy concerns involved with using data collected with real humans as training data.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Training a multi-object tracking model includes: generating a plurality of training images based at least on scene generation information, each training image comprising a plurality of objects to be tracked; generating, for each training image, original simulated data based at least on the scene generation information, the original simulated data comprising tag data for a first object; locating, within the original simulated data, tag data for the first object, based on at least one of an occlusion alert, a proximity alert, or a motion alert (or other anomaly alert) associated with the first object in the first training image; based at least on locating the tag data for the first object, modifying at least a portion of the tag data for the first object from the original simulated data, thereby generating preprocessed training data from the original simulated data; and training a multi-object tracking model with the preprocessed training data to produce a trained multi-object tracker.

BRIEF DESCRIPTION OF THE DRAWINGS

The disclosed examples are described in detail below with reference to the accompanying drawing figures listed below:

FIG. 2 illustrates states of occlusion of an object within training images, as may occur when employing the arrangement of FIG. 1A;

FIG. 4 illustrates exemplary stages of data in a hybrid simulation generated by the arrangement of FIG. 1A;

FIG. 6 is another flowchart illustrating exemplary operations involved in training a multi-object tracking model with the arrangement of FIG. 1A.

Corresponding reference characters indicate corresponding parts throughout the drawings.

DETAILED DESCRIPTION

Figure 1A:
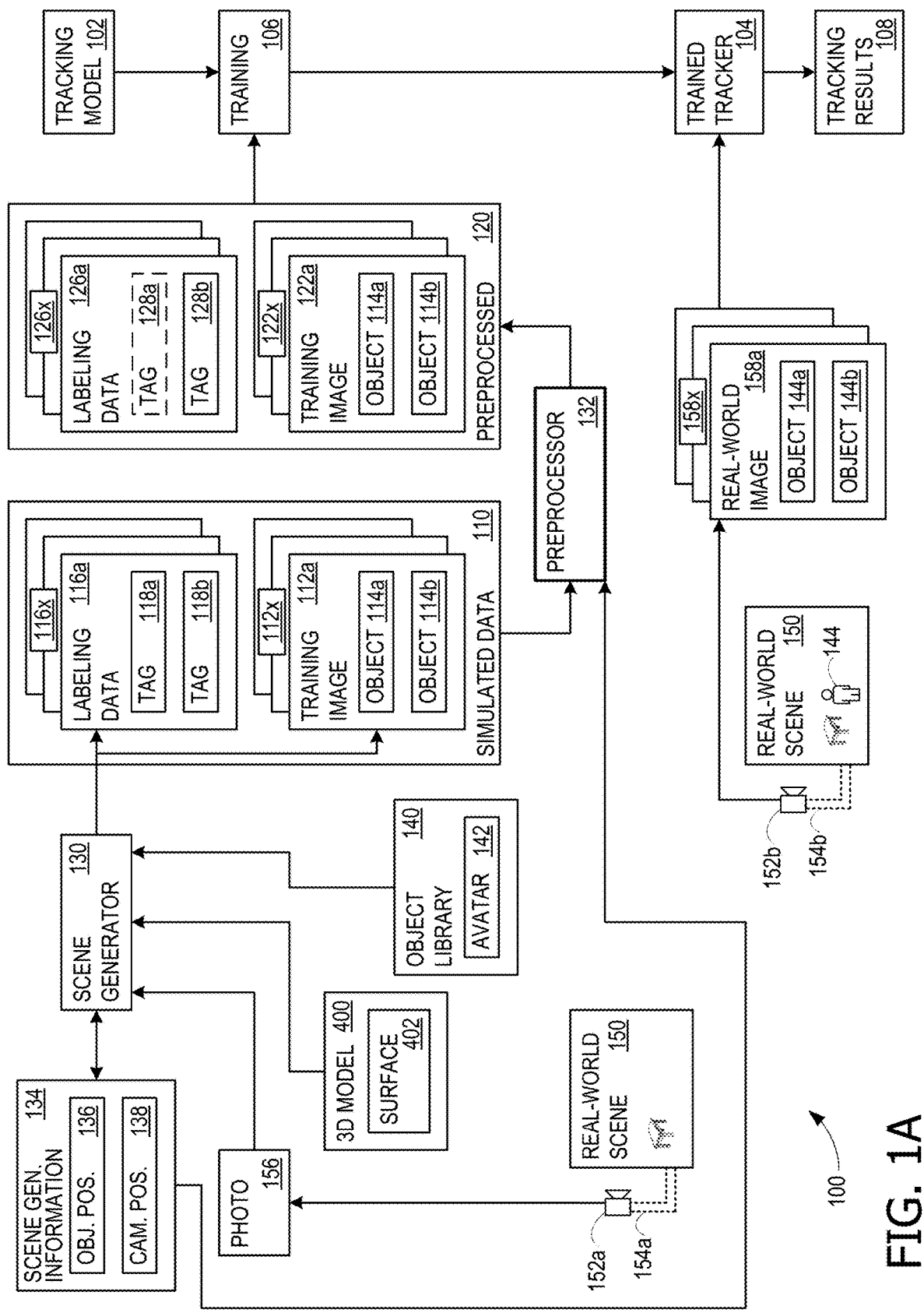
FIG. 1A illustrates an arrangement for advantageously training multi-object tracking models using simulation.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Training a multi-object tracking model includes: generating a plurality of training images based at least on scene generation information, each training image comprising a plurality of objects to be tracked; generating, for each training image, original simulated data based at least on the scene generation information, the original simulated data comprising tag data for a first object; locating, within the original simulated data, tag data for the first object, based on at least one of an occlusion alert, a proximity alert, or a motion alert associated with the first object in the first training image; based at least on locating the tag data for the first object, modifying at least a portion of the tag data for the first object from the original simulated data, thereby generating preprocessed training data from the original simulated data; and training a multi-object tracking model with the preprocessed training data to produce a trained multi-object tracker.

The use of synthetics and simulation to produce a high-volume of labeled simulated training data (e.g., both video imagery and tags) is facilitated by a simulation environment that generates ground truth information while also generating the synthetic imagery. The simulation environment has the information of where objects to be tracked (e.g., humans) are within the images, because the simulation environment placed them in their virtual locations and rendered the imagery using that scene generation information. Thus, tags for the objects may be automatically generated for large numbers of synthetic training images. Additionally, in some situations, abnormal behaviors may be more easily simulated than collected from real human subjects, providing a greater data diversity in simulated data.

Other anomalous conditions may also be detected and annotated in the labeling data. For example, an anomaly alert may be one or more of an occlusion alert, a proximity alert, a motion alert, or another anomalous condition (e.g., fall, improper interaction with another object, injury, pending injury, pending collision between one or more objects) or an anomalous behavior (e.g., detection of aggression or evasiveness). A proximity alert may occur when two objects (e.g. humans or human avatars, vehicles, etc.) are within a particular distance, for example closer together than a recommended social distance, according to a social distancing algorithm. In some examples, a proximity alert is also based on whether there is an intervening object between two objects, such as a plastic or plexiglass screen between two humans that precludes a proximity alert for example. Characteristics of the intervening object, such as material, dimensions, and location, may be used in combination with distance data in determining whether to generate a proximity alert. Thus, in an example scenario of a cashier and a customer within two meters of each other at a checkout counter, a proximity alert will not occur if there is a sufficient barrier provided by an intervening object (such as a non-porous screen) between the humans. A motion alert may occur when a human (or other object, such as a vehicle) is moving too rapidly for an environment, or perhaps has been idle tor too long. For example, a running human, a human who has not moved for an extended period of time, a speeding vehicle, and a vehicle parked in a particular location for outside a threshold amount of time, may trigger a motion alert. In some examples, motion and proximity may be combined, such as if two humans are approaching each other, or a human is approaching a moving object and an anomalous condition may be predicted to occur.

As a contrast, with traditional object detection processes that lack the automatic labeling capability of synthetics (e.g., manual labeling of real-world, unscripted images), determining distance and speed of objects using just visual camera information may be prohibitively complex, error-prone, and/or time-consuming. Thus, the use of synthetics, in which such information is known when generating the imagery, provides practical, significant improvements in efficiency and accuracy of training for optimized accuracy in detection.

Often, during the procession of sequences of the images in time (e.g., a video stream) the objects to be tracked may become occluded by either other objects being tracked (e.g., other humans, other vehicles) or by elements within the modeled scene (e.g., walls, shelves, signs, buildings, trees, etc.). For example, in a crowded scene, with 50 or more people moving around, occlusion may occur often. If an occluded model is still labeled (tagged) within the training data, even when it will not be visible to the multi-object tracking model being trained, that particular training case may actually degrade the performance of the trained multi-object tracking model (trained multi-object tracker). The question arises, for example, "When should a human be labeled as a human in the training data?"

Aspects of the disclosure operate in an unconventional manner to modify at least a portion of tag data for an object that is occluded by at least a threshold measure in a training image. For example, as the sequences of labeled training images progresses in time, a first object being tracked may change from visible, to occluded by a threshold amount, and then back to visible. For those images (frames) in which the first object is occluded by at least the threshold amount, the labeling may be modified, for example by removing a bounding box, a trajectory identification, and/or modifying some other tag data. The result is a higher quality preprocessed training data, generated from the original simulated data. In this manner, aspects of the disclosure improve artificial intelligence (AI) operations of trained multi-object trackers. In addition, aspects of the disclosure provide advantages over traditional object detection processes that rely on visual or RGB camera images and require manual labeling of the captured real-world, unscripted images. The use of synthetics, which automatically labels images and provides object metadata with such information improves the efficiency and accuracy of training for optimized accuracy in detection and object tracking.

Given a small quantity of on-site data from a proposed deployment environment, the disclosure is able to adapt to the new environment by creating training data specifically for the new environment. This is achieved by simulating the virtual environment, adding virtual humans into the scene, and/or by creating a hybrid environment by combining the scan of the real-world scene with virtual humans. In either cases, the on-site data is used for evaluation purposes and provides an unbiased preview estimate of the expected accuracy at the proposed deployment site. For example, when a human (e.g., a human avatar) is occluded by another object, the images (video frames) are retained in the video stream, but labeled to indicate the occlusion. Occlusion by another human may be different than occlusion by a non-human object, and so such occlusions may be identified differently. Retaining the images while annotating the occlusion provides superior training for the tracker over excluding the frames.

Other anomalous conditions may also be detected and annotated in the labeling data. For example, an anomaly alert may be one or more of an occlusion alert, a proximity alert, a motion alert, or another anomalous condition (e.g., fall, improper interaction with another object, injury, pending injury, pending collision between one or more objects) or an anomalous behavior (e.g., detection of aggression or evasiveness). A proximity alert may occur when two objects (e.g. humans or human avatars, or vehicles) are within a particular distance, for example closer together than a recommended social distance, according to a social distancing algorithm. In some examples, a proximity alert is also based on whether there is an intervening object, such as a plastic or plexiglass screen between two humans that precludes a proximity alert. Characteristics of the intervening object, such as material, dimensions, and location, may be used in determining whether to generate a proximity alert. Thus, in an example scenario of a cashier and a customer within two meters of each other at a checkout counter, a proximity alert will not occur if there is a sufficient barrier (such as a non-porous screen) between the humans. A motion alert may occur when a human (or other object, such as a vehicle) is moving too rapidly for an environment, or perhaps has been idle tor too long. For example, a running human, a human who has not moved for an extended period of time, a speeding vehicle, and a vehicle parked in a particular location within or outside a threshold amount of time, may trigger a motion alert.

Detection of anomalous conditions, such as close proximity (e.g., proximity within a threshold measure, without an intervening object), anomalous motion (e.g., moving too quickly, idle for too long, or in a particular direction), or other conditions and behavior, is facilitated by using synthetics. Because synthetic scenes are generated based on a scene model and scene generation information, the information necessary to detect anomalous conditions is available or calculable by the scene generator. Such information may be leveraged by another component (e.g., a preprocessor) to generate anomaly alerts and modify tag information accordingly.

FIG. 1A illustrates an arrangement 100 that advantageously employs simulation to generate preprocessed training data 120, which is used by a training component 106 to a train multi-object tracking model 102 (with preprocessed training data 120) to produce a trained multi-object tracker 104. When a plurality of captured live images 158x is input into trained multi-object tracker 104, trained multi-object tracker 104 outputs tracking results 108. This is a practical result that provides improved performance, using aspects of the disclosure.

A scene generator 130 uses and produces scene generation information 134 to generate a training image 112a along with other training images as plurality of training images 112x. Plurality of training images 112x may represent a video stream, when arranged as forms a sequence of images in time. Plurality of training images 112x includes a plurality of objects to be tracked, for example, object 114a and object 114b in training image 112a. Other training images may also show objects 114a and 114b and/or other objects. Scene generation information 134 includes ground truth information, for example object positions 136 and virtual (synthetic) camera position 138 in a three-dimensional (3D) model 400 for a scene being modeled. As a result, scene generator 130 is able to automatically label plurality of training images 112x, thereby producing original simulated data 110, based at least on scene generation information 134.

Original simulated data 110 includes labeling data 116x and plurality of training images 112x. As indicated in FIG. 1A, there may be labeling specific to individual training images, such as labeling data 116a for training image 112a. Labeling data 116a has tag data 118a for object 114a and tag data 118b for object 114b, and may be stored as metadata for training image 112a. In some examples, a social distancing algorithm measures distances between (human) objects, and a selected set of distances from a subject object to other nearby objects is included in the subject object's tag data. Original simulated data 110 is processed by a preprocessor 132 to generate preprocessed training data 120. Preprocessed training data 120 has a plurality of training images 122x and labeling data 126x. In some examples, plurality of training images 122x is the same as plurality of training images 112x, although, in some examples, there may be additional processing performed on plurality of training images 112x (e.g., image clean-up, cropping, resolution adjustment), such that plurality of training images 122x has some differences. For example, training image 122a may be a cropped version of training image 112a, although training image 122a is indicated as still showing objects 114a and 114b.

As described above, in some scenarios, an object may be at least partially occluded (e.g., obscured by another object or partially outside training image 122a), or may have another anomalous condition. If the occlusion (or other anomaly) is sufficiently significant, the training value of preprocessed training data 120 is improved by removing or modifying (together, modifying) tag data for object 114a. This, labeling data 126a for training image 122a is shown as having modified tag data 128a for object 114a, and tag data 128b for object 114b may also be modified, relative to tag data 118b. Modification of tag data 118a to become tag data 128a may include annotations of occlusion by a human (or human avatar) or a non-human object, such as a shelf unit or a sign, and/or annotations of proximity, motion, or other anomalous conditions.

Figure 1B:
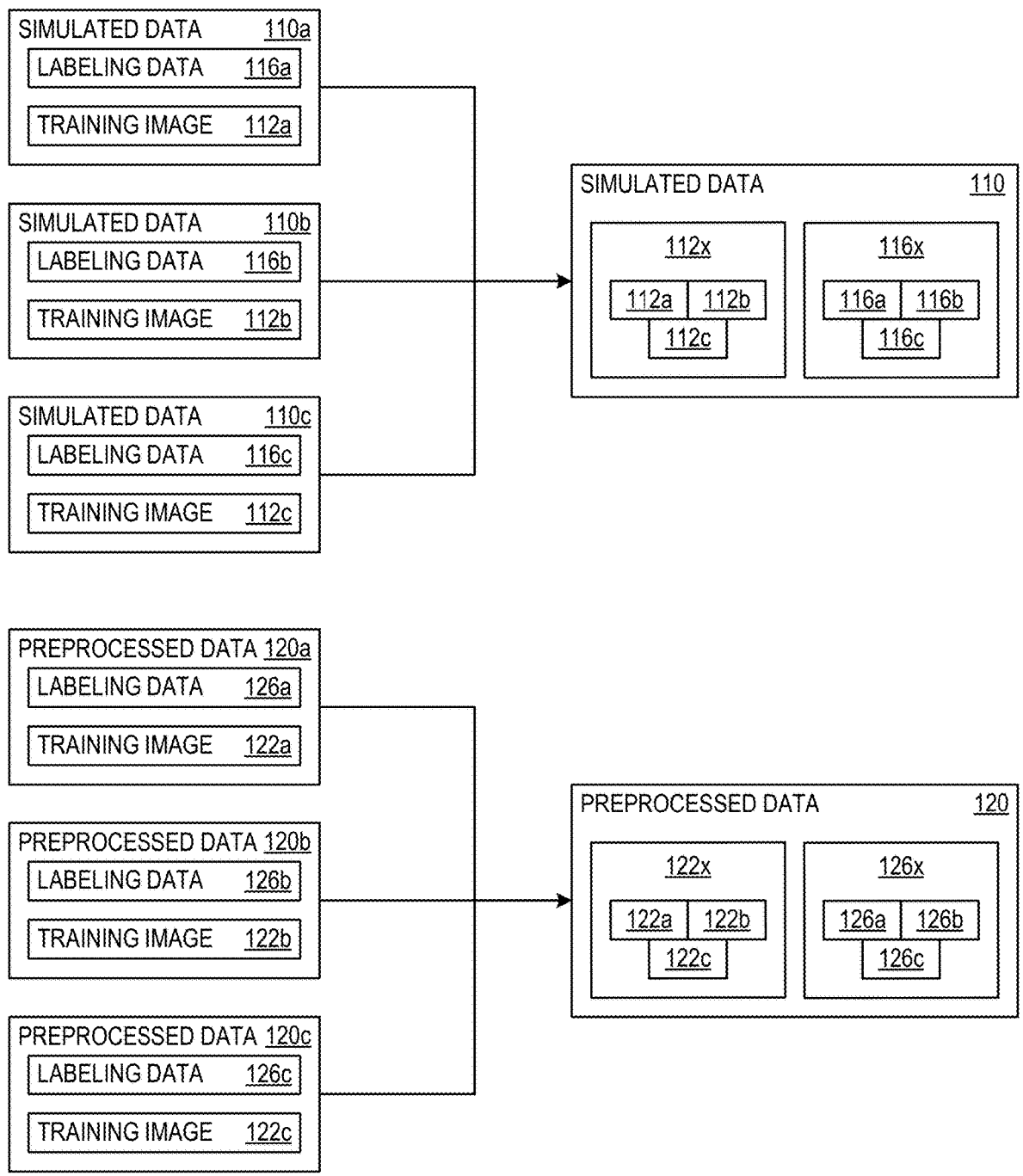
FIG. 1B illustrates relationships among data used within the arrangement of FIG. 1A.

Turning briefly to FIG. 1B, relationships among data sets thus described are illustrated. Together, training image 112a and labeling data 116a form original simulated data 110a for training image 112a. Similarly, training image 112b and labeling data 116b form original simulated data 110b for training image 112b, and training image 112c and labeling data 116c form original simulated data 110c for training image 112c. Training images 112a-112c together form plurality of training images 112x, and labeling data 116a-116c together form labeling data 116x. Grouping training images 112x and labeling data 116x together forms original simulated data 110.

Likewise, training image 122a and labeling data 126a together form preprocessed training data 120a for training image 122a. Similarly, training image 122b and labeling data 126b form preprocessed training data 120b for training image 122b, and training image 122c and labeling data 126c form preprocessed training data 120c for training image 122c. Training images 122a-122c together form plurality of training images 122x, and labeling data 126a-126c together form labeling data 126x. Grouping training images 122x and labeling data 126x together forms preprocessed training data 120.

Returning to FIG. 1A, operations of scene generator 130 are described in further detail. Scene generator 130 draws from 3D model 400, which includes at least one surface 402, for example a floor or table upon which objects may be placed (virtually). Examples of 3D model 400 and surface 402 are shown in FIG. 4. Objects may be drawn from an object library 140, for example object 114a may be represented by a human avatar 142. In some examples, human avatar 142 is able to provide photo-realism for training image 112a and other training images. In some examples, human avatar 142 comprises a photographic 3D image of a life-like human. To provide additional photo realism, in some examples, scene generator intakes a photographic image 156 of a real-world scene 150 and composites a rendering of the 3D model 400 with photographic image 156 (e.g., on surface 402 and other surfaces).

Photographic image 156 of real-world scene 150 is collected using a first camera 152a at a position 154a measured relative to real-world scene 150. In some examples, position 154a is measured with 6 degrees of freedom (6DoF): x-coordinate position, y-coordinate position, z-coordinate position, and 3 pointing measurements, yaw, pitch, and roll. Other coordinate systems for expressing 6DoF may also be used. In some examples, real-world scene 150 is the same scene for which trained multi-object tracker 104 will later be tracking objects, using a surveillance camera 152b at a position 154b measured (also in 6DoF) relative to real-world scene 150. In some examples, surveillance camera 152b is used as camera 152a, and positions 154a and 154b are the same. In some examples, cameras 152 and 152b are different and/or positions 154a and 154b are different. In some examples, camera position 138 is calibrated so that training image 112a appears to be collected (captured) from a camera at position 154b, even if photographic image 156, which is used for compositing a rendering of 3D model 400, is collected from position 154a.

Basing 3D model 400 on real-world scene 150, along with scripting object motion for objects expected to employ motion (e.g. human avatars, vehicles) to be typical for the behavior (e.g. human behavior) within real-world scene 150, enables trained multi-object tracker 104 to be a scenario-specific hybrid simulation (e.g., a mix of actual imagery from a target scene with human avatars in place of images of real humans). Scenario-specific simulation may include modeling human-human interaction and human-object interaction within a specific environment, such as a retail environment and an industrial environment, in which such interactions may differ significantly.

This enables testing trained multi-object tracker 104 to provide an unbiased estimate of the expected accuracy of trained multi-object tracker 104 when deployed at the site of real-world scene 150. If ambient camera views (e.g., from surveillance monitoring cameras) exist on-site, this hybrid approach may be used to generate plausible datasets from target camera views, as well as calibrate the target views without a calibration board. This may be accomplished by mixing the target views with the camera images used for spatial mapping and localization. Multiple sensor views may be calibrated simultaneously.

When trained multi-object tracker 104 is deployed, surveillance camera 152b captures live images 158x as a video stream (e.g., a sequence of images in time). As indicated, a human 144 within real-world scene 1590 becomes an object 144a in image 158a, which may be tracked, along with another object 144b, by trained multi-object tracker 104, and indicated in output tracking results 108. Image 158a also shows a second object 144b, which may also be indicated in output tracking results 108.

FIG. 2 illustrates states of occlusion of object 114a within a set of three training images 201-203 that form a sequence in time. Training images 201-203 may be within plurality of training images 122x, for example, training image 202 may be training image 122a. Training images 201-203 may be spaced further apart in time relative to typical video stream frames, and so are not necessarily immediately following each other in a video stream. In the sequence, illustrated training image 201 precedes training image 202, which precedes training image 203.

In training image 201, object 114a is partially visible and partially occluded behind another object 204. Object 114a is positioned within training image 201 based on having been inserted into 3D model 400 and placed on surface 402, which represents a floor in this example. In some scenarios, object 204 is another object to be tracked, such as another human avatar. In some scenarios, object 204 is merely an element of 3D model 400, such as a wall, a piece of furniture, a sign, or another obstruction. A bounding box 210 surrounds object 114a in training image 201, and a trajectory identification 212 is also annotated for object 114a. In some examples, bounding box 210 and trajectory identification 212 are not drawn within the pixels of training image 201, but instead are metadata annotations, stored within labeling data 116x as tag data. For example, bounding box 210 may be expressed as the x-y coordinates in the pixel space of training image 201, identifying four corner points that define a rectangle, and are stored as metadata. Trajectory identification 212a may likewise be expressed as a set of pixel coordinates and stored as metadata.

Additional metadata, which may also be used as tag data and may thus be found within labeling data 116x and/or scene generation information 134, include a segmentation mask 214, an occlusion mask 216, and a landmark data set 218. In some examples, human avatars are assigned a dense point mesh that identify certain features, such as facial features (points on eyes, nose, mouth, chin, and others), and features of hands, feet, and other body parts. Such a data set may assist with, for example face detection and/or recognition, as well as differentiating between human-shaped objects and other objects.

Segmentation mask 214 identifies which pixels in a generated image are calculated, based at least on the object's placement within 3D model 400 and a camera position 138, to correspond with the object, rather than scene background. Occlusion mask 216 identifies the portion of the object that is occluded by other objects. A threshold measure 220 is used to determine whether object 114a is sufficiently occluded to warrant preprocessor 132 modifying at least a portion of the tag data for object 114a. Occlusion mask 216 may be defined with a variety of different metrics, such as the number of pixels occluded or visible (not occluded), the percentage of pixels occluded or visible, maximum or minimum dimensions, and may even be weighted according to the body parts visible. Using the percentage of landmark data set 218 visible or occluded may provide one way of weighting threshold measure 220. For example, a given number of pixels showing a featureless part of a human body (e.g., the middle portion of a human's back with no landmarks) may result in threshold measure 220 being met, whereas the same number of pixels showing facial features (and thus includes a larger percentage of landmark data set 218) may result in threshold measure 220 not being met. Whichever metric is used for threshold measure 220, when threshold measure 220 is met for object 114a, preprocessor 132 will modify tag data for object 114a (e.g., annotate occlusion by a human or a non-human object).

As indicated, in training image 202, object 114a is occluded by object 204. Thus, neither bounding box 210 nor trajectory identification 212 is provided in tag data for training image 202. When object 114a emerges from behind object 204 in training image 203, and object 114a is thus no longer occluded (by an amount that meets threshold measure 220), preprocessor 132 does not modify tag data for object 114a. As a result, both bounding box 210 and trajectory identification 212 are retained for training image 203.

Figure 3:
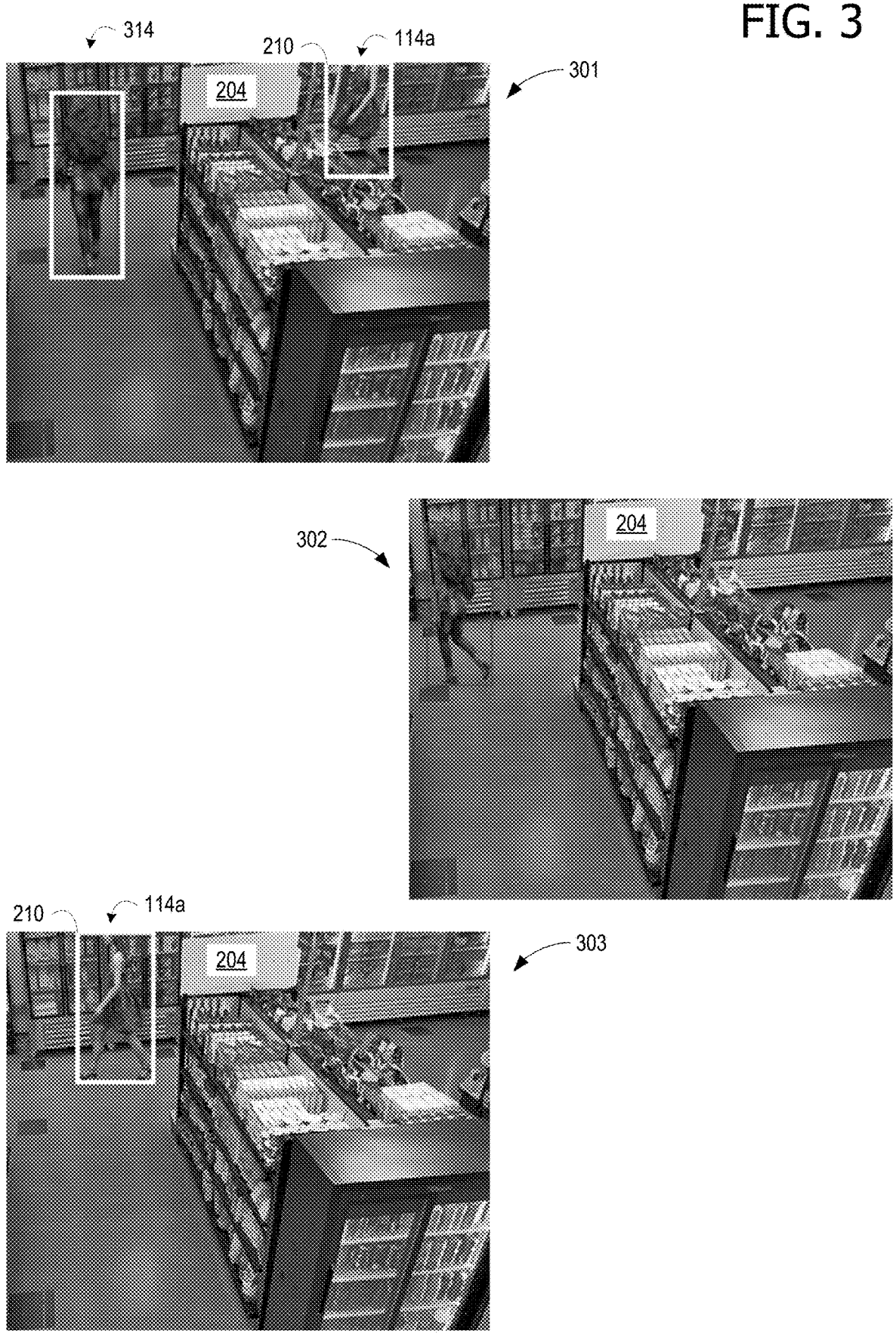
FIG. 3 illustrates examples of training images generated by the arrangement of FIG. 1A.

FIG. 3 illustrates examples of training images generated by a version of arrangement 100. Images 301-303 form a sequence in time, with image 301 preceding image 302, which precedes image 303. In FIG. 3, object 114a is represented as human avatar 142. In image 301, object 114a is not yet occluded by object 204 (shown as a sign), and bounding box 210 is retained. In image 302, object 114a is occluded by object 204, so bounding box 210 is removed. In image 302, object 114a has emerged from behind object 204 (and is no longer occluded by threshold measure 220, so bounding box 210 is retained.

Another human avatar object 314 is nearby (human avatar) object 114a, initially (in image 301) separated by a shelf beneath object 204, and object 204 sitting on the shelf at a sufficient height to block a straight line between the faces of object 114a and object 314. Thus, based on the specifics of a proximity alert algorithm (e.g., a social distancing algorithm), a proximity alert may or may not occur. Additionally, because the movements of each of objects 114a and 314 is known, and thus the relative velocity may be ascertained, it may be calculable that a collision is imminent. In some examples, this may trigger a motion or other anomaly alert. However, as seen in image 303, object 314 moved in a safe direction.

FIG. 4 illustrates exemplary stages of data in a hybrid simulation generated by arrangement 100. A two-dimensional (2D) version of 3D model 400 is represented, showing various surfaces. For example, surface 402 is a floor upon which human avatars may be placed when inserted into 3D model 400. Surface 403 and surface 404 are walls, which may occlude some human avatars, for example if they (virtually) walk behind surface 404. Surface 405, surface 406, surface 407, and surface 408 for a staircase, upon which human avatars may be placed, and which also may occlude some human avatars, for example if they (virtually) walk beneath the staircase.

An image 410 is generated by compositing a rendered 3D model 400 with a photographic image (e.g., photographic image 156). The 3D geometry acts as an augmentation layer to ground the human avatar into the real-world photograph. As shown object 114a, represented as human avatar 142, is placed at a position at least partially determined by surface 402 (e.g., human avatar 142 is walking on surface 402). Image 410 illustrated a hybrid approach to making a scene. A captured image of a real-world environment is used to composite a virtual world model (3D model 400), and human avatars are inserted (e.g., human avatar 142 is inserted as object 114a). The human avatars interact with defined surfaces of the virtual world model, for example, climbing a staircase or turning their trajectories to avoiding walking into walls. Hybrid scenes may result in superior photo-realism, in some examples.

A group 414 of multiple human avatar objects is seen within close proximity of each other. In some examples, each object within group 414 will have modified tag data for each object within a proximity alert threshold distance. That is, multiple anomaly alerts may occur for any given object. For example, a single object may have a motion alert on its own, and multiple proximity alerts indicating that multiple other objects are too close.

Figure 5A:
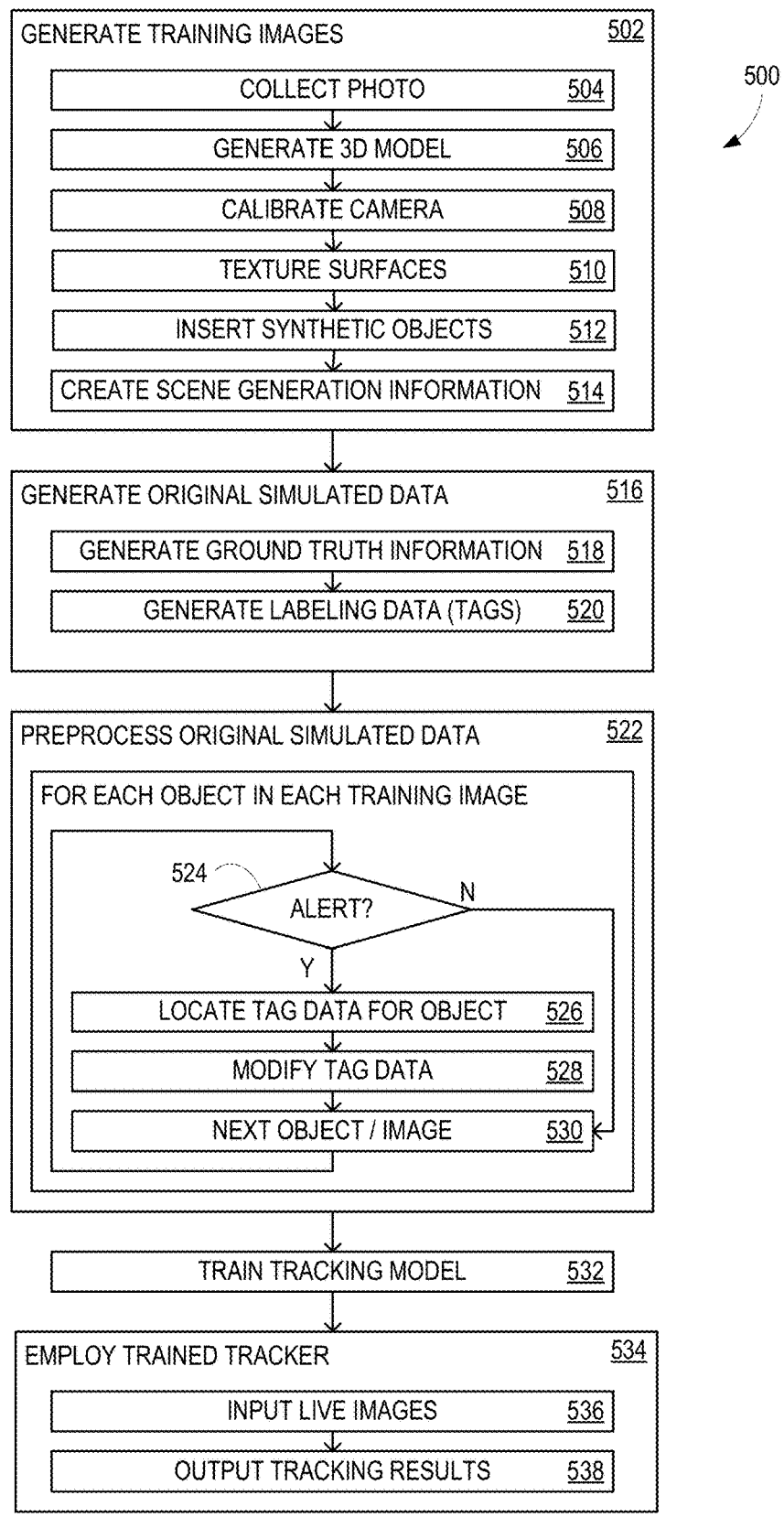
FIG. 5A is a flowchart illustrating exemplary operations involved in training a multi-object tracking model with the arrangement of FIG. 1A.

FIG. 5A is a flowchart 500 illustrating exemplary operations involved in training multi-object tracking model 102 with arrangement 100. In some examples, operations described for flowchart 500 are performed by computing device 700 of FIG. 7. Flowchart 500 commences with operation 502, which includes generating a plurality of training images (e.g., plurality of training images 112x) based at least on scene generation information (e.g., scene generation information 134), each training image (e.g., training image 112a) comprising a plurality of objects to be tracked (e.g., object 114a), the plurality of training images forming a sequence of images in time. Operation 502 includes operations 504-514.

Operation 504 includes collecting a photographic image (e.g., photographic image 156) of a real-world scene (e.g., real-world scene 150). Operation 506 includes generating a synthetic 3D model (e.g., 3D model 400) comprising at least one surface (e.g., surface 402). Operation 508 includes calibrating a camera model with respect to a position and orientation (e.g., camera position 138) relative to the 3D model. Operation 510 includes compositing a rendering of the 3D model with the photographic image. Operation 512 includes inserting a first object (e.g., object 114a) into the synthetic 3D model at a position at least partially determined by the surface. In some examples, the first object comprises a human avatar. Other synthetic objects may also be inserted. In some examples, the plurality of objects to be tracked, in the plurality of training images, comprises a plurality of synthetic objects. Operation 514 includes creating the scene generation information.

Operation 516 includes operations 518 and 520, which together result in generating, for each training image, original simulated data (e.g., original simulated data 110) based at least on the scene generation information, the original simulated data comprising tag data (e.g., tag data 118b) for the first object of the plurality of objects. In some examples, the original simulated data comprises original labeling data (e.g., labeling data 116a) and the plurality of training images. In some examples, the original labeling data comprises tag data for the first object. Operation 518 includes generating ground truth information, and operation 520 includes generating original labeling information (including tag data) for the first object and other objects in the plurality of training images.

Preprocessing of the original simulated data occurs in operation 522, which includes operations 524-530. Operations 524-530 are performed for each object in each training image. Decision operation 524 determines whether an anomaly alert has occurred. An anomaly alert may be one or more of an occlusion alert, a proximity alert, a motion alert, or another anomalous condition (e.g., fall, improper interaction with another object, injury, pending injury, pending collision) or an anomalous behavior (e.g., detection of aggression or evasiveness). A proximity alert may occur when two humans (or human avatars) are within a particular distance, for example closer together than a recommended social distance. In some examples, a proximity alert is also based on whether there is an intervening object, such as a plastic or plexiglass screen between two humans that precludes a proximity alert. A motion alert may occur when a human (or other object, such as a vehicle) is moving too rapidly for an environment, or perhaps has been idle tor too long. In some examples, motion and proximity may be combined, such as if two humans are approaching each other, or a human is approaching a moving object and an anomalous condition may be predicted to occur.

An occlusion alert may occur when an object is occluded by a threshold measure (e.g., threshold measure 220). If not, the next object is considered at 530. If there is sufficient occlusion, the tag data is located as operation 526, which includes, for example, locating, within the original simulated data for a first training image of the plurality of training images, tag data for the first object, based on at least one of an occlusion alert, a proximity alert, or a motion alert associated with the first object in the first training image. In some examples, the tag data comprises at least one data item selected from the list consisting of: a bounding box, a segmentation mask, an occlusion mask, a landmark data set, and a trajectory identification. Examples may be bounding box 210, trajectory identification 212, segmentation mask 214, occlusion mask 216, and landmark data set 218.

Selected tag data (e.g., a bounding box) for the occluded object is modified in operation 528 which includes, for example, based at least on locating the tag data for the first object, modifying at least a portion of the tag data for the first object from the original simulated data for the first training image, thereby generating preprocessed training data from the original simulated data. In some examples, modifying at least a portion of the tag data comprises adding occlusion information to the tag data, if an occlusion alert had occurred. In some examples, modifying at least a portion of the tag data comprises adding proximity information to the tag data, if a proximity alert had occurred. In some examples, modifying at least a portion of the tag data comprises adding motion information to the tag data, if a motion alert had occurred. In some examples, modifying at least a portion of the tag data comprises adding condition information to the tag data, if a condition alert had occurred (e.g., fall, improper interaction with another object, injury, pending injury or collision) or an anomalous behavior (e.g., detection of aggression or evasiveness). In some examples, modifying at least a portion of the tag data comprises adding behavior information to the tag data, if a behavior alert had occurred (e.g., detection of aggression or evasiveness).

The preprocessed training data thus comprises modified labeling data for the plurality of training images (e.g., some tag data has been removed or altered). That is, in some examples, the modified labeling data is missing at least some tag data for the first object, in comparison with the original labeling data. In some examples, the plurality of training images further comprises a second training image preceding the first training image in time, the first object is not occluded by the threshold measure in the second training image, and the preprocessed training data for the second training image retains tag data for the first object (e.g., the tag data is not modified). In some examples, the plurality of training images further comprises a third training image following the first training image in time, the first object is not occluded by the threshold measure in the third training image, and the preprocessed training data for the third training image retains tag data for the first object (e.g., the tag data is not modified). The next object or image is identified for processing at operation 530.

Operation 532 includes training a multi-object tracking model (e.g., a multi-object tracking model 102) with the preprocessed training data to produce a trained multi-object tracker (e.g., trained multi-object tracker 104). The trained multi-object tracker is employed in operation 534, which includes operations 536 and 538. Operation 36 includes inputting a plurality of captured live images (e.g., live images 158x) into the trained multi-object tracker. Operation 538 includes, based at least on the plurality of captured live images, outputting tracking results from the trained multi-object tracker. In some examples, the tracking results comprise tracking results for real-world objects (e.g., human 144 becomes object 144a within image 158a) within the plurality of captured live images.

Figure 5B:
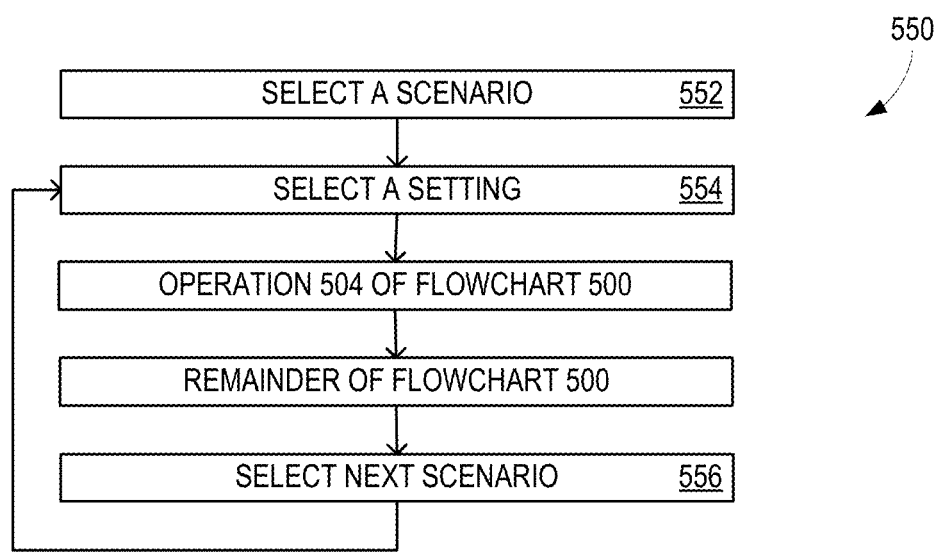
FIG. 5B is another flowchart illustrating exemplary operations involved in training a multi-object tracking model with the arrangement of FIG. 1A.

Flowchart 500 may be used for scenario-specific applications. FIG. 5B is a flowchart 550 illustrating exemplary operations involved in training multi-object tracking model 103 with arrangement 100, specifically for scenario-specific applications. In some examples, operations described for flowchart 500 are performed by computing device 700 of FIG. 7. Flowchart 550 commences with operation 552, which includes selecting a scenario for a first scenario-specific hybrid simulation, such as a retail or industrial scenario. A setting for the first scenario-specific hybrid simulation is selected in operation 554, for example a portion of a retail store space or a portion of a factory floor.

A photographic image of a real-world scene is collected, according to operation 504 of flowchart 500. Executing the remainder of flowchart 500 results in performing a first scenario-specific hybrid simulation based at least on a first photographic image of a first real-world scene. The next scenario is selected in operation 556, and flowchart 550 returns to operation 554. The subsequent iteration results in performing a second scenario-specific hybrid simulation based at least on a second photographic image of a second real-world scene. In some examples, the second real-world scene is in a different setting than the first real-world scene.

FIG. 6 is a flowchart 600, also illustrating exemplary operations involved in training multi-object tracking model 102 with arrangement 100. In some examples, operations described for flowchart 600 are performed by computing device 700 of FIG. 7. Flowchart 600 commences with operation 602, which includes generating a plurality of training images based at least on scene generation information, each training image comprising a plurality of objects to be tracked, the plurality of training images forming a sequence of images in time.

Operation 604 includes generating, for each training image, original simulated data based at least on the scene generation information, the original simulated data comprising tag data for a first object of the plurality of objects. Operation 606 includes locating, within the original simulated data for a first training image of the plurality of training images, tag data for the first object, based on at least one of an occlusion alert, a proximity alert, or a motion alert associated with the first object in the first training image. Operation 608 includes, based at least on locating the tag data for the first object, modifying at least a portion of the tag data for the first object from the original simulated data for the first training image, thereby generating preprocessed training data from the original simulated data. Operation 610 includes training a multi-object tracking model with the preprocessed training data to produce a trained multi-object tracker.

Additional Examples

An exemplary system for training a multi-object tracking model comprises: a processor; and a computer-readable medium storing instructions that are operative upon execution by the processor to: generate a plurality of training images based at least on scene generation information, each training image comprising a plurality of objects to be tracked, the plurality of training images forming a sequence of images in time; generate, for each training image, original simulated data based at least on the scene generation information, the original simulated data comprising tag data for a first object of the plurality of objects; locate, within the original simulated data for a first training image of the plurality of training images, tag data for the first object, based on at least one of an occlusion alert, a proximity alert, or a motion alert associated with the first object in the first training image; based at least on locating the tag data for the first object, modify at least a portion of the tag data for the first object from the original simulated data for the first training image, thereby generating preprocessed training data from the original simulated data; and train a multi-object tracking model with the preprocessed training data to produce a trained multi-object tracker.

An exemplary method of training a multi-object tracking model comprises: generating a plurality of training images based at least on scene generation information, each training image comprising a plurality of objects to be tracked, the plurality of training images forming a sequence of images in time; generating, for each training image, original simulated data based at least on the scene generation information, the original simulated data comprising tag data for a first object of the plurality of objects; locating, within the original simulated data for a first training image of the plurality of training images, tag data for the first object, based on at least one of an occlusion alert, a proximity alert, or a motion alert associated with the first object in the first training image; based at least on locating the tag data for the first object, modifying at least a portion of the tag data for the first object from the original simulated data for the first training image, thereby generating preprocessed training data from the original simulated data; and training a multi-object tracking model with the preprocessed training data to produce a trained multi-object tracker.

One or more exemplary computer storage devices has computer-executable instructions stored thereon, which, on execution by a computer, cause the computer to perform operations comprising: generating a plurality of training images based at least on scene generation information, each training image comprising a plurality of objects to be tracked, the plurality of training images forming a sequence of images in time; generating, for each training image, original simulated data based at least on the scene generation information, the original simulated data comprising tag data for a first object of the plurality of objects; locating, within the original simulated data for a first training image of the plurality of training images, tag data for the first object, based on at least one of an occlusion alert, a proximity alert, or a motion alert associated with the first object in the first training image; based at least on locating the tag data for the first object, modifying at least a portion of the tag data for the first object from the original simulated data for the first training image, thereby generating preprocessed training data from the original simulated data; and training a multi-object tracking model with the preprocessed training data to produce a trained multi-object tracker.

Alternatively, or in addition to the other examples described herein, examples include any combination of the following:
  inputting a plurality of captured live images into the trained multi-object tracker;
  the plurality of captured live images forms a sequence of images in time;
  based at least on the plurality of captured live images, outputting tracking results from the trained multi-object tracker;
  the first object comprises a human avatar;
  locating, within the original simulated data for a first training image of the plurality of training images, tag data for the first object, based on at least one of an anomaly alert associated with the first object in the first training image an
  an anomaly alert comprises an occlusion alert, a proximity alert, a motion alert, a condition alert, and/or a behavior alert;
  the plurality of training images further comprises a second training image preceding the first training image in time;
  the first object is not occluded by the threshold measure in the second training image;
  the preprocessed training data for the second training image retains tag data for the first object;
  the plurality of training images further comprises a third training image following the first training image in time;
  the first object is not occluded by the threshold measure in the third training image;
  the preprocessed training data for the third training image retains tag data for the first object;
  the tag data comprises at least one data item selected from the list consisting of: a bounding box, a segmentation mask, an occlusion mask, a landmark data set, and a trajectory identification.
  generating the plurality of training images comprises collecting a photographic image of a real-world scene;
  generating the plurality of training images comprises generating a synthetic 3D model comprising at least one surface;
  generating the plurality of training images comprises compositing a rendering of the 3D model with the photographic image;
  generating the plurality of training images comprises inserting the first object into the synthetic 3D model at a position at least partially determined by the surface;
  generating the plurality of training images comprises calibrating a camera model with respect to a position and orientation relative to the 3D model;
  generating the plurality of training images comprises creating scene generation information;
  the plurality of objects to be tracked, in the plurality of training images, comprises a plurality of synthetic objects;
  generating ground truth information;
  generating original labeling information;
  the tracking results comprise tracking results for real-world objects within the plurality of captured live images;
  performing a first scenario-specific hybrid simulation based at least on a first photographic image of a first real-world scene;
  performing a second scenario-specific hybrid simulation based at least on a second photographic image of a second real-world scene;
  the second real-world scene in a different setting than the first real-world scene;
  the original simulated data comprises original labeling data and the plurality of training images;
  the original labeling data comprises tag data for the first object;
  the preprocessed training data comprises modified labeling data for the plurality of training images; and
  the modified labeling data is missing at least some tag data for the first object, in comparison with the original labeling data.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
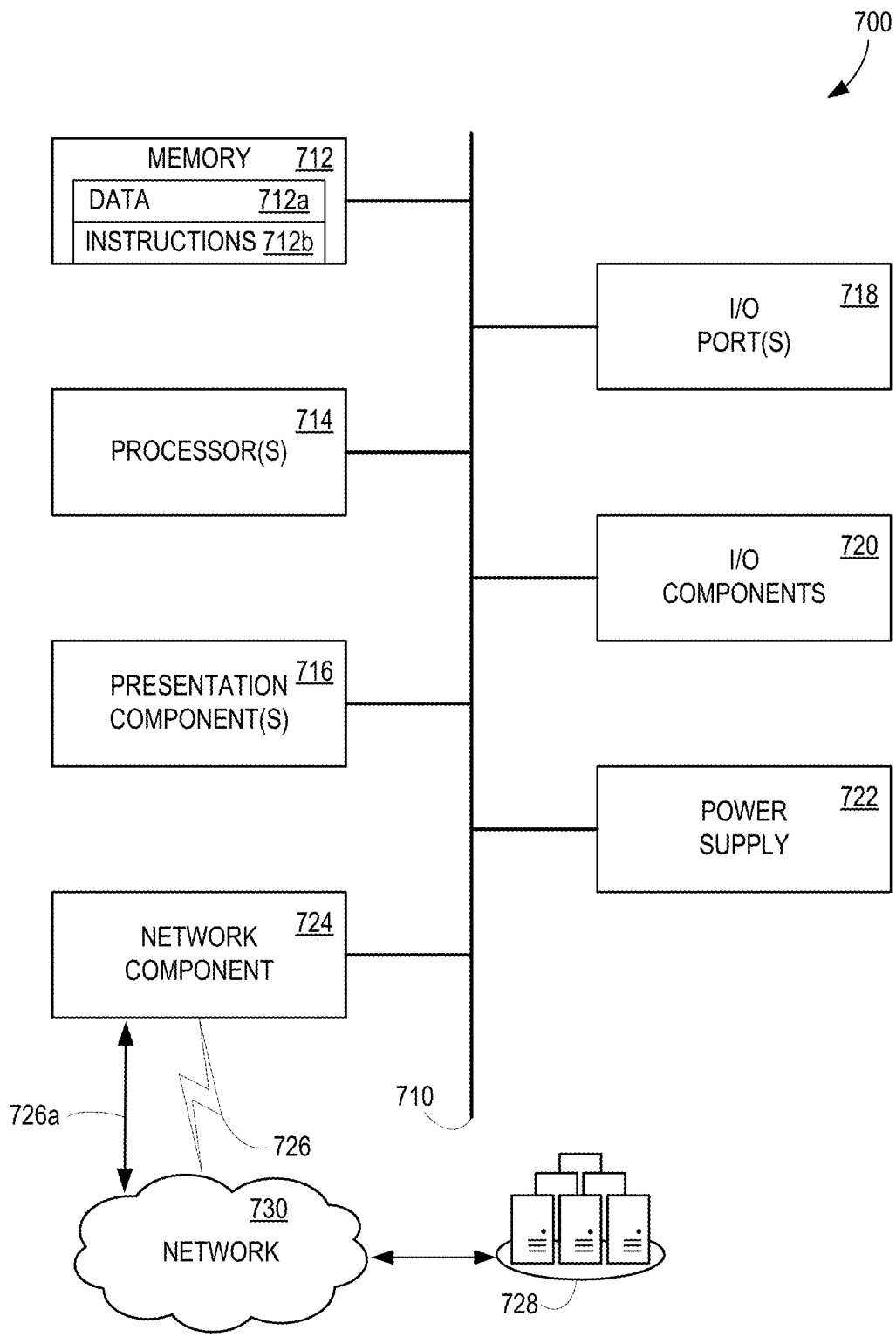
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer-storage memory 712, one or more processors 714, one or more presentation components 716, I/O ports 718, I/O components 720, a power supply 722, and a network component 724. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer-storage media references below and operatively provide storage of computer-readable instructions, data structures, program modules and other data for the computing device 700. In some examples, memory 712 stores one or more of an operating system, a universal application platform, or other program modules and program data. Memory 712 is thus able to store and access data 712a and instructions 712b that are executable by processor 714 and configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by the computing device 700. Memory 712 may be internal to the computing device 700 (as shown in FIG. 7), external to the computing device 700 (not shown), or both (not shown). Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 700. Additionally, or alternatively, the memory 712 may be distributed across multiple computing devices 700, for example, in a virtualized environment in which instruction processing is carried out on multiple devices 700. For the purposes of this disclosure, "computer storage media," "computer-storage memory," "memory," and "memory devices" are synonymous terms for the computer-storage memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for multi-object tracking, the system comprising:
   a processor; and
   a computer-readable medium storing instructions that are operative upon execution by the processor to:
      locate, within original simulated data for a training image of a plurality of training images, tag data for an object, based at least on an anomaly alert associated with the object in the training image; and
      based at least on locating the tag data for the object, modify at least a portion of the tag data for the object from the original simulated data for the training image, thereby generating preprocessed training data from the original simulated data.

2. The system of claim 1, further comprising instructions that are operative upon execution by the processor to:
   generate the plurality of training images based at least on scene generation information, each training image of the plurality of training images comprising a plurality of objects to be tracked.

3. The system of claim 2, further comprising instructions that are operative upon execution by the processor to:
   generate, for each training image, the original simulated data based at least on the scene generation information, the original simulated data comprising the tag data for the object of the plurality of objects.

4. The system of claim 2, wherein the scene generation information includes synthetic camera position information for a modeled scene.

5. The system of claim 2, wherein the scene generation information includes at least one of a segmentation mask, an occlusion mask, and a landmark data set.

6. The system of claim 5, wherein the segmentation mask identifies which pixels in a generated image are calculated to correspond to with the object rather than a scene background.

7. The system of claim 1, wherein the plurality of training images form a sequence of images in time.

8. The system of claim 1, wherein the preprocessed training data generated from the original simulated data is used to train a multi-object tracking model to produce a trained multi-object tracker.

9. A system for multi-object tracking, the system comprising:
   a processor; and
   a computer-readable medium storing instructions that are operative upon execution by the processor to:
   detect an anomalous condition associated with an object in a training image;
   generate an anomaly alert based on the detected anomalous condition;
   locate, within original simulated data for the training image, tag data for the object, based on the anomaly alert associated with the object in the training image;

based on locating the tag data for the object, modify at least a portion of the tag data for the object from the original simulated data for the training image; and generate preprocessed training data from the original simulated data using the modified portion of the tag data for the object from the original simulated data for the training image.

10. The system of claim 9, further comprising instructions that are operative upon execution by the processor to:

generate a plurality of training images based at least on scene generation information, each training image of the plurality of training images comprising a plurality of objects to be tracked.

11. The system of claim 10, further comprising instructions that are operative upon execution by the processor to:

generate, for each training image, individual original simulated data based at least on the scene generation information, the individual original simulated data comprising individual tag data for individual object of the plurality of objects to be tracked.

12. The system of claim 9, wherein the anomalous condition comprises at least one condition selected from the list consisting of:

an object motion, an object interaction, an object occlusion, an object collision, an object behavior, an object proximity.

13. The system of claim 9, wherein camera position is calibrated to generate the training image to appear to be captured from a camera at a specific position.

14. A method comprising:

detecting, by a computing device, an anomalous condition associated with an object in a training image;

generating an anomaly alert based on the detected anomalous condition;

locating, within original simulated data for the training image, tag data for the object, based on the anomaly alert associated with the object in the training image;

based on locating the tag data for the object, modifying at least a portion of the tag data for the object from the original simulated data for the training image; and generating preprocessed training data from the original simulated data using the modified portion of the tag data for the object from the original simulated data for the training image.

15. The method of claim 14, further comprising:

generating a plurality of training images based at least on scene generation information, each training image of the plurality of training images comprising a plurality of objects to be tracked.

16. The method of claim 15, further comprising:

generating, for each training image, individual original simulated data based at least on the scene generation information, the individual original simulated data comprising individual tag data for individual object of the plurality of objects to be tracked.

17. The method of claim 14, wherein the anomalous condition comprises at least one condition selected from the list consisting of:

an object motion, an object interaction, an object occlusion, an object collision, an object behavior, an object proximity.

18. The method of claim 14, further comprising:

calibrating a camera position to generate the training image to appear to be captured from a camera at a specific position.

19. The method of claim 14, wherein the preprocessed training data generated from the original simulated data is used to train a multi-object tracking model to produce a trained multi-object tracker.

20. The method of claim 14, wherein modifying the portion of the tag data for the object further comprises at least one of the following:

adding occlusion information to the tag data;
adding proximity information to the tag data;
adding motion information to the tag data;
adding condition information to the tag data; or
adding behavior information to the tag data.

* * * * *